US008375668B2

(12) United States Patent
Kuepfer

(10) Patent No.: US 8,375,668 B2
(45) Date of Patent: Feb. 19, 2013

(54) SEAL GUARD LIP AND TAPE SYSTEMS

(76) Inventor: Robert Paul Kuepfer, Kitchener (CA)

( * ) Notice: Subject to any disclaimer, the term of this patent is extended or adjusted under 35 U.S.C. 154(b) by 166 days.

(21) Appl. No.: 13/006,567

(22) Filed: Jan. 14, 2011

(65) Prior Publication Data

US 2011/0173923 A1    Jul. 21, 2011

Related U.S. Application Data

(60) Provisional application No. 61/296,582, filed on Jan. 20, 2010.

(51) Int. Cl.
*E04B 5/00* (2006.01)
(52) U.S. Cl. .................................... 52/409; 52/746.1
(58) Field of Classification Search .............. 52/409, 52/741.1, 420, 408, 746.1, 749.15
See application file for complete search history.

(56) References Cited

U.S. PATENT DOCUMENTS

| | | | | |
|---|---|---|---|---|
| 3,307,306 A | * | 3/1967 | Oliver | 52/409 |
| 3,979,867 A | | 9/1976 | Sowinski | |
| 3,985,198 A | | 10/1976 | Kurtze et al. | |
| 4,114,346 A | * | 9/1978 | Kelly | 52/746.1 |
| 4,606,957 A | * | 8/1986 | Cohen | 428/40.9 |
| 5,104,701 A | * | 4/1992 | Cohen et al. | 428/34.5 |
| 5,421,371 A | * | 6/1995 | Lauer | 138/110 |
| 5,736,211 A | * | 4/1998 | Fontanilla | 428/40.1 |
| 5,894,700 A | | 4/1999 | Sweet | |
| 5,942,300 A | * | 8/1999 | Lukowski, Sr. | 428/40.1 |
| 6,223,378 B1 | * | 5/2001 | Watellier | 15/103.5 |
| 6,453,632 B1 | | 9/2002 | Huang | |
| 6,818,286 B2 | | 11/2004 | Dhring | |
| 6,935,379 B1 | * | 8/2005 | Buchanan, Sr. | 138/149 |
| 7,077,185 B2 | * | 7/2006 | Steinberger | 156/527 |
| 2006/0130416 A1 | | 6/2006 | Mohr et al. | |

* cited by examiner

*Primary Examiner* — Basil Katcheves

(57) ABSTRACT

Seal Guard Lip & Tape System provides users with an efficient means and method for applying underlay for various types of flooring. The system entails the joining of two laminate floor underlay sections to create a vapor barrier. The vapor barrier provides superior sealing by utilizing vapor barrier tape with release liner, and also reduces harm to installed flooring. Seal Guard Lip & Tape System may comprise foam underlay with vapor barrier qualities, vapor barrier tape, and release liner, all of which can be laminated together. The specially formulated vapor barrier tape can be attached to a 1½" release liner, which may be made of siliconized paper plastic, covering approximately half of the tape. The vapor barrier tape/release liner combination may be joined to the laminate underlay with 1½" of the tape and liner exposed beyond the foam underlay. The entire assembly can be easily affixed to an adjacent underlay sheet, thereby creating a sealing means.

16 Claims, 6 Drawing Sheets

SEAL GUARD LIP AND TAPE SYSTEMS

CROSS-REFERENCE TO RELATED APPLICATION

The present application is related to and claims priority from prior provisional application Ser. No. 61/296,582, filed Jan. 20, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of seam sealing and more specifically relates to a lip and tape system for use in seam sealing during flooring installations.

2. Description of the Related Art

Floor covering is a term to generically describe any finish material applied over a floor structure to provide a walking surface and may include 'flooring'. Materials almost always classified as floor coverings may include carpet(s), area rugs, and resilient flooring such as linoleum or vinyl flooring. Materials commonly referred to as flooring may include wood flooring, ceramic tile, stone, terrazzo, and various seamless chemical floor coatings. Modern residential and commercial buildings use various types of flooring materials to provide aesthetically-pleasing and comfortable surfaces to walk upon. These flooring materials must be durable for extended periods of time, thus specialized processes during construction must be adhered to to ensure longevity of the product. Traditionally, a subfloor is used to provide the foundation for the overlaid flooring to provide the necessary support. Special purpose subfloors like floating floors, raised floors or sprung floors may be laid upon another underlying subfloor which provides the structural strength.

The choice of material for floor covering may be affected by factors such as cost, endurance, noise insulation, comfort and desired cleaning effort. Some types of flooring should not be installed below grade (lower than ground level), such as laminate or hardwood. This particular flooring option should generally be avoided where there may be moisture or condensation or properly protected, as discussed subsequently herein. Many different species of wood are fabricated into wood flooring in two primary forms: plank and parquet. Hardwoods are typically much more durable than softwoods. Laminate is a popular floor covering that appears similar to hardwood but is made with a plywood or medium density fiberboard ("MDF") core with a plastic laminate top layer. HDF laminate consists of high density fiberboard topped by one or more layers of decorative paper and a transparent protective layer. These flooring options have become popular because of their reasonable cost, ease of installation, pleasing aesthetic qualities and relative durability. If not installed correctly, these laminates may become compromised by moisture ruining their fit and finish. Use of a vapor barrier may provide a feasible solution to this problem.

A vapor barrier is often used to refer to any material, typically a plastic or foil sheet that resists diffusion/wicking of moisture through walls, ceilings and floor assemblies of buildings. Vapor barriers may be used between laminate or wood flooring and the subfloor to substantially prevent water vapor from rising through the subflooring and damaging the wood flooring, especially important when installing wood flooring over concrete. A Polyethylene vapor barrier of 4 mil. or thicker is typically required to put under the laminate floor. Another alternative installation is to use a 2-in-1 foam underlay with a built in vapor barrier. A reliable means for joining the vapor barrier is needed to ensure its integrity.

Traditional lip and tape systems commonly used traditionally have minimal amounts of adhesion at the seam, which may compromise the integrity of the vapor barrier. This point of compromise is generally located at the seam. Traditional methods of sealing the seam of a vapor barrier underlayment consist of joining the sections of underlayment with an overlapping film using a thin strip of adhesive. The lack of provided adhesive coverage can reduce the integrity of the vapor seal. As afore-mentioned if the vapor barrier is compromised, moisture can penetrate and cause the floor to swell and break down. Also, the process of laminating film to foam may be tedious, complex, and may produce hazardous fumes. Further, using the traditional systems may increase the length of installation time of a flooring project, causing additional expense. These flooring materials must be durable for extended periods of time. A more efficient solution is necessary.

Various attempts have been made to solve the above-mentioned problems such as those found in U.S. Pat. And Pub. U.S. Pat. Nos. 3,979,867; 6,453,632; 2006/0130416; 2003/0077433; 3,985,198; and 5,894,700. This prior art is representative of seam sealing. None of the above inventions and patents, taken either singly or in combination, is seen to describe the invention as claimed.

Ideally, a seal guard lip & tape system should be installation-friendly and, yet would operate reliably and be manufactured at a modest expense. Thus, a need exists for a reliable seal guard lip & tape system to protect flooring and to avoid the above-mentioned problems.

BRIEF SUMMARY OF THE INVENTION

In view of the foregoing disadvantages inherent in the known seam sealing art, the present invention provides a novel seal guard lip & tape system. The general purpose of the present invention, which will be described subsequently in greater detail is to provide an efficient and effective vapor barrier while installing various types of flooring.

A seal guard lip & tape system is disclosed herein comprising: a vapor barrier tape; a release liner preferably being about 1½ inches wide; and foam underlay with vapor barrier qualities; wherein the vapor barrier tape is removably attached to the release liner to form a vapor barrier tape/release liner assembly. The release liner is preferably made of siliconized paper plastic, and covers about half of the vapor barrier tape; the vapor barrier tape/release liner assembly is attachable to a sheet of the foam underlay and an adjacent sheet of the foam underlay (as a connection) wherein the joining of the two adjacent sheets of the underlay creates a vapor barrier. The vapor barrier tape/release liner assembly is preferably laminated. The release liner is removable from the vapor barrier tape as the adjacent sheets of underlay are joined/connected by a flooring installer; wherein the vapor barrier tape/release liner assembly is joined to laminate underlay with about 1½ inches of the vapor barrier tape and the release liner are exposed beyond the foam underlay to create a suitable flooring sealing installation.

A method of using the seal guard lip & tape system is disclosed herein comprising the steps of: joining of laminate floor underlay sections to create a vapor barrier; and sealing by utilizing a vapor barrier tape/release liner assembly. Other optional steps are also provided subsequently.

The present invention holds significant improvements and serves as a seal guard lip & tape system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, seal guard lip & tape system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a seam sealing device and more particularly to a seal guard lip & tape system as used to provide an efficient and effective vapor barrier while installing various types of flooring.

Traditional lip and tape system have minimal amounts of adhesion at the seam, which may compromise the integrity of vapor barrier. This point of compromise is generally located at the seam. Traditional methods of sealing the seam of a vapor barrier underlayment consist of joining the sections of underlayment with an overlapping film using a thin strip of adhesive. The lack of provided adhesive coverage can reduce the integrity of the vapor seal. If the vapor barrier is compromised, moisture can penetrate and cause the floor to swell and break down potentially ruining the flooring installation and costing the consumer additional expense and frustration. Also, the process of laminating film to foam may be tedious, complex, and may produce hazardous fumes. Using these systems may increase the length of installation of a flooring project, causing workers to waste valuable time. A more efficient solution is necessary which the present invention serves to provide according to the following disclosure.

Seal Guard Lip & Tape System as disclosed herein provides users with an efficient method of applying underlay for various types of flooring. This unique system entails the joining of two laminate floor underlay sections to create a vapor barrier. The vapor barrier provides superior sealing by utilizing vapor barrier tape with release liner, and also reduces harm to installed flooring. Consumers and installers who use this system enjoy the efficient manner in which flooring jobs can be performed with the help of the present invention. Seal Guard Lip & Tape System allows users to create an effective vapor barrier while installing various types of flooring.

Figure 1:
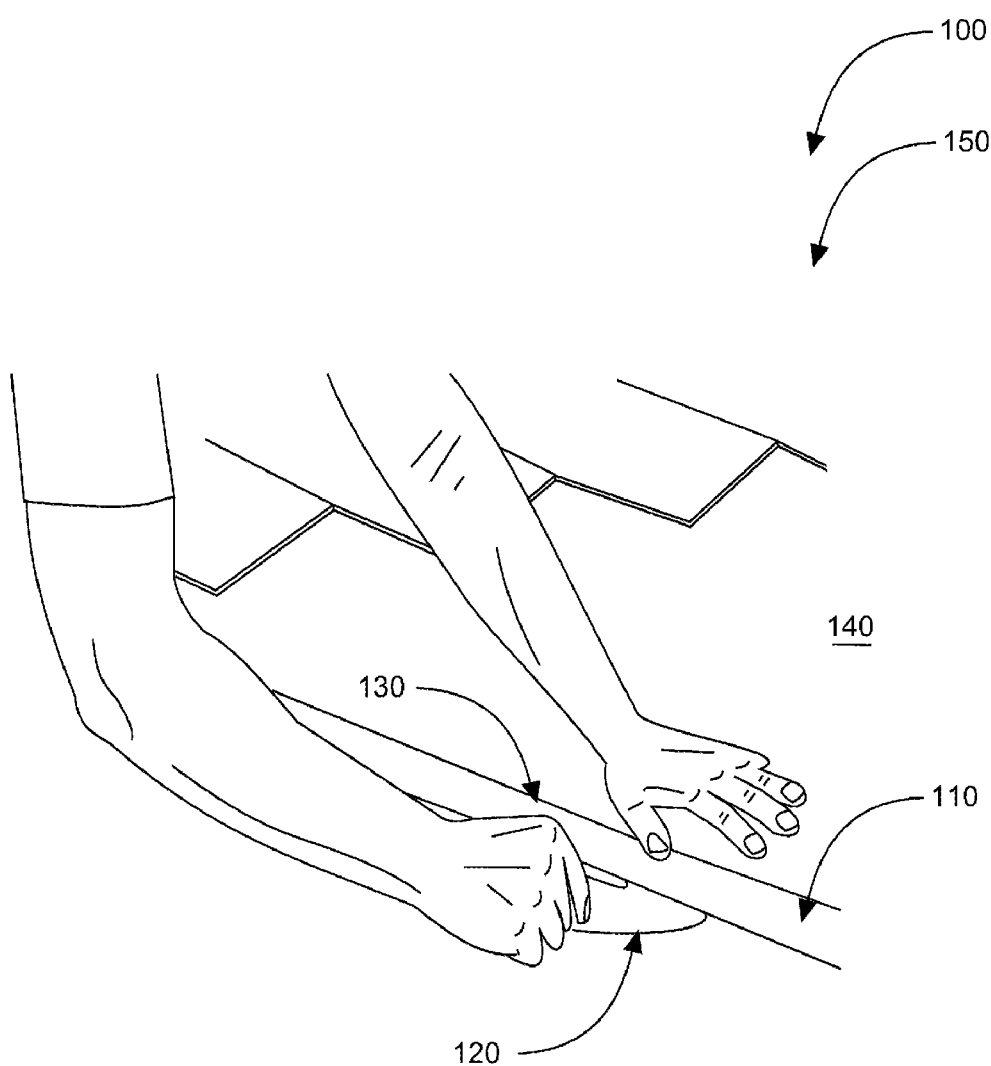
FIG. 1 shows a perspective view illustrating a seal guard lip & tape system as used during a floor installation process according to an embodiment of the present invention.

Referring to the drawings by numerals of reference there is shown in FIG. 1, a perspective view illustrating seal guard lip & tape system 100 as used during floor installation process 150 according to an embodiment of the present invention.

Seal guard lip & tape system 100 preferably comprises: vapor barrier tape 110; release liner 120 preferably being about 1½ inches wide (may be wider or narrower according to application); wherein vapor barrier tape 110 is attached (removably) to release liner 120 to form vapor barrier tape/release liner assembly 130. In the present invention release liner 120 is preferably made of siliconized paper plastic, and covers half of vapor barrier tape 110. Vapor barrier tape/release liner assembly 130 is joined to laminate foam underlay 140 with 1½ inches of vapor barrier tape 110 and release liner 120 exposed beyond foam underlay 140 to create a suitable flooring sealing installation of floor installation process 150.

Seal guard lip & tape system 100 preferably is used in joining of two adjacent sheets (seams) of foam underlay 140 which creates a vapor barrier. Vapor barrier tape 110 is removably attached to release liner 120 to form vapor barrier tape/release liner assembly 130 via a roller-applier machine 300 such that vapor barrier tape/release liner assembly 130 is disassemblable. Release liner 120 is removable from vapor barrier tape 110 as adjacent sheets of foam underlay 140 are joined, as shown in the present figure. As discussed above, using seal guard lip & tape system 100 provides superior sealing and may be applied according to method of use 600, as discussed in FIG. 6.

Figure 2:
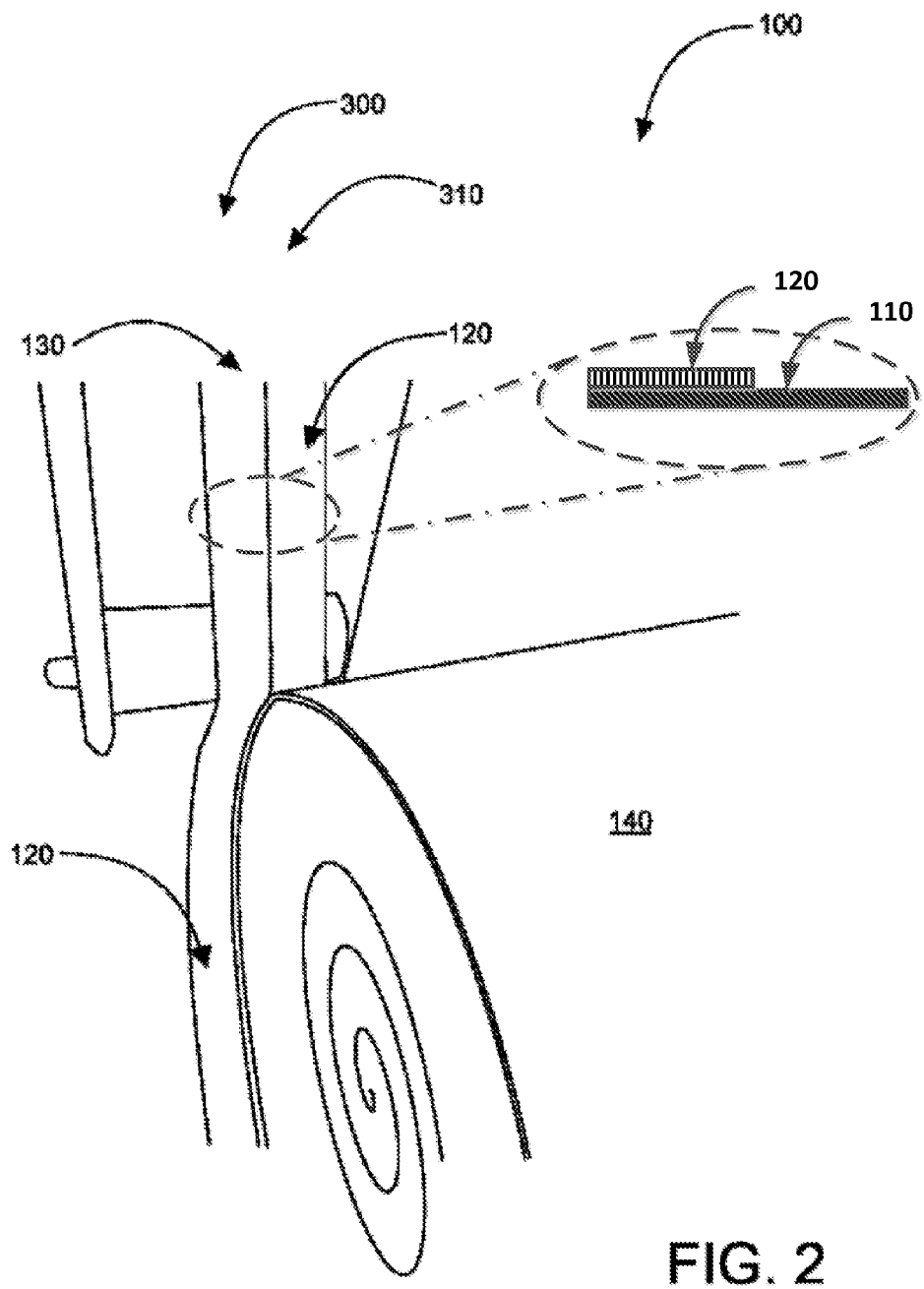
FIG. 2 is a perspective view illustrating application of vapor barrier tape to foam underlay of the seal guard lip & tape system according to an embodiment of the present invention of FIG. 1.

Referring now to FIG. 2, a perspective view illustrating application of vapor barrier tape 110 to foam underlay 140 of seal guard lip & tape system 100 according to an embodiment of the present invention of FIG. 1.

Seal guard lip & tape system 100 as discussed in FIG. 1 comprises vapor barrier tape/release liner assembly 130 which is attachable to foam underlay 140 and used in connecting an adjacent sheet of foam underlay 140, thereby creating a sufficient vapor barrier. In this way the present invention serves to protect installable flooring systems such as laminate and others using foam underlay 140. In this way seal guard lip & tape system 100 comprises foam underlay 140 with vapor barrier qualities. This provides convenience and cost-effectiveness for consumers using the product described herein. Vapor barrier tape/release liner assembly 130 is preferably laminated.

Figure 3:
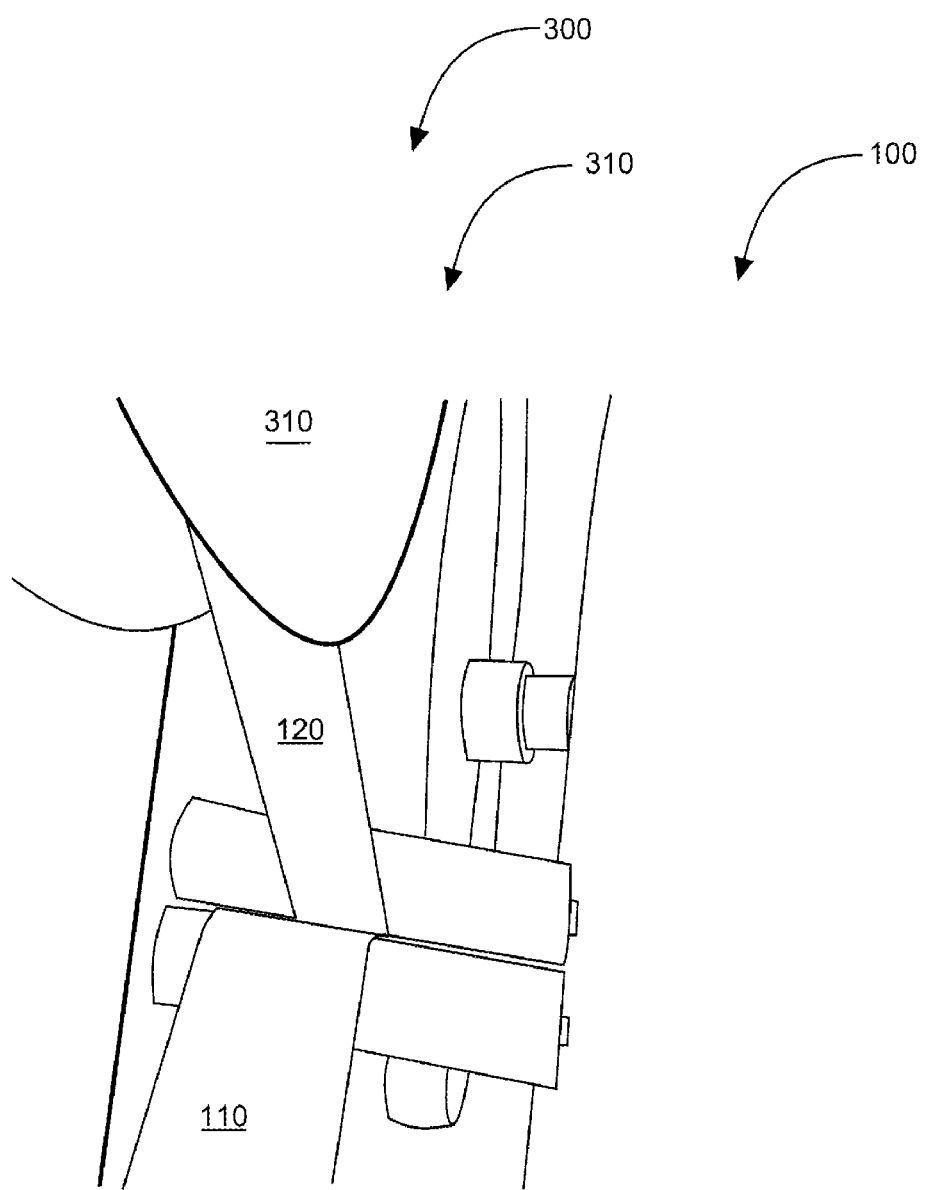
FIG. 3 is a perspective view illustrating application of release liner to the vapor barrier tape of the seal guard lip & tape system according to an embodiment of the present invention of FIG. 1.
Figure 4:
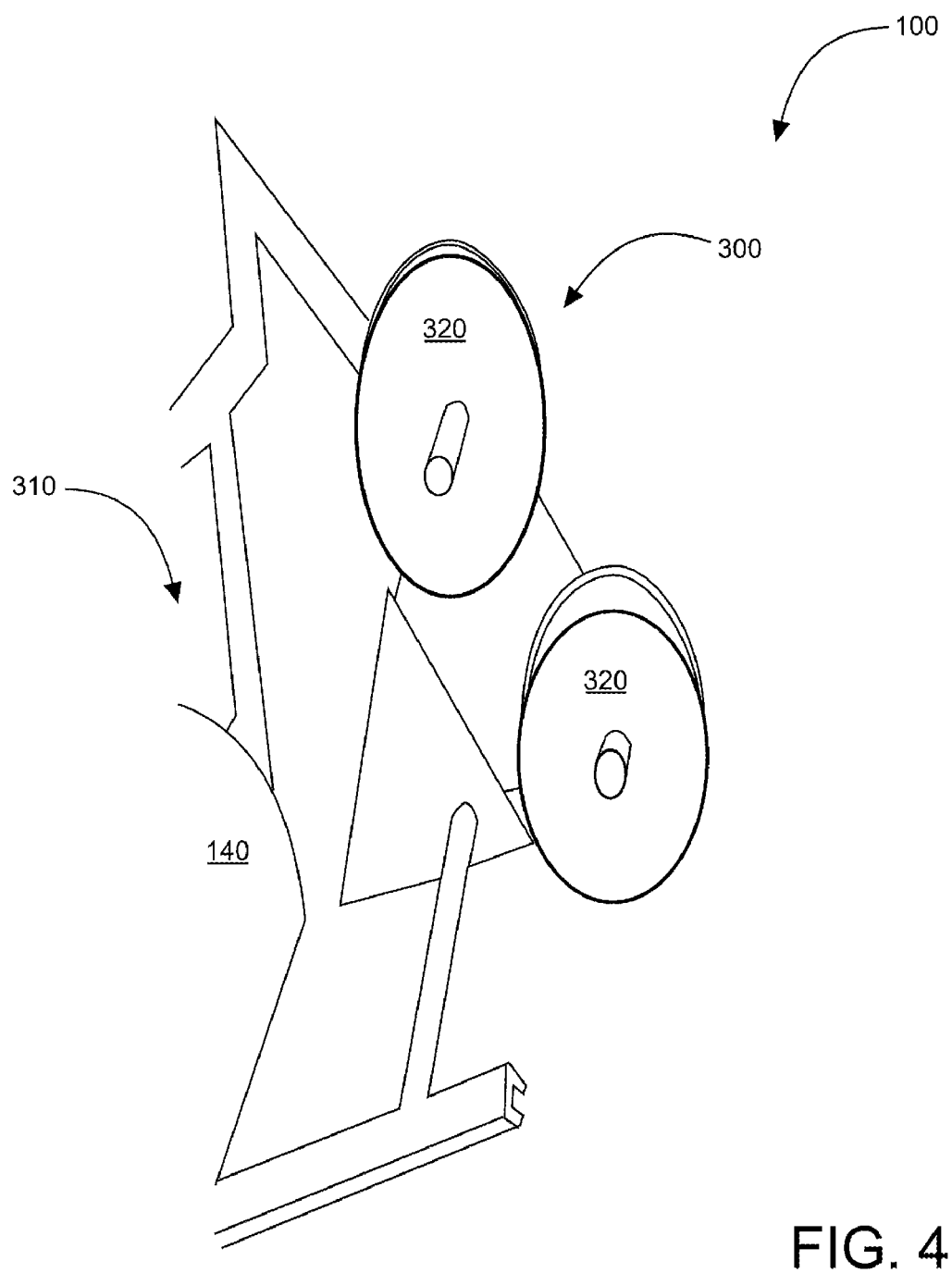
FIG. 4 is a perspective view illustrating a vapor barrier tape dispensing machine for use with the seal guard lip & tape system according to an embodiment of the present invention of FIG. 1.

Referring now to FIGS. 3 and 4 concurrently, FIG. 3 showing a perspective view illustrating application of release liner 120 to vapor barrier tape 110 of seal guard lip & tape system 100 and FIG. 4, illustrating vapor barrier tape dispensing machine 310 (roller-applier machine 300) for use with seal guard lip & tape system 100 both according to an embodiment of the present invention of FIG. 1.

As discussed previously, seal guard lip & tape system 100 comprises vapor barrier tape 110 which is preferably attached (removably) to release liner 120 to form vapor barrier tape/release liner assembly 130 via roller-applier machine 300. Roller-applier machine 300 is attached to manufacturing equipment in a converting line. In this way the manufacturer is able to apply the SealGuard system in their factory so that the finished packaged rolls have the Seal Guard already attached and the consumer simply installs as per normal by peeling off the siliconized release liner as they butt the underlay together. In this way the present invention is cost-effective and time-efficient in use. Roller-applier machine 300 preferably comprises rotatable wheels 320 or disks, wherein rotatable wheels 320 rotate to form (apply/install) vapor barrier tape/release liner assembly 130. Upon reading this specification, it should be appreciated that, under appropriate circumstances, considering such issues as user preferences, design preference, structural requirements, marketing preferences, cost, available materials, technological advances, etc., other roller arrangements such as, for example, spinners, rotatable member, casters, drum, gyration, gyre, hoop, pivot, pulley, ratchet, ring, roller, rotator, rollers may be arranged to rotatably travel in the same way, etc., may be sufficient.

Figure 5:
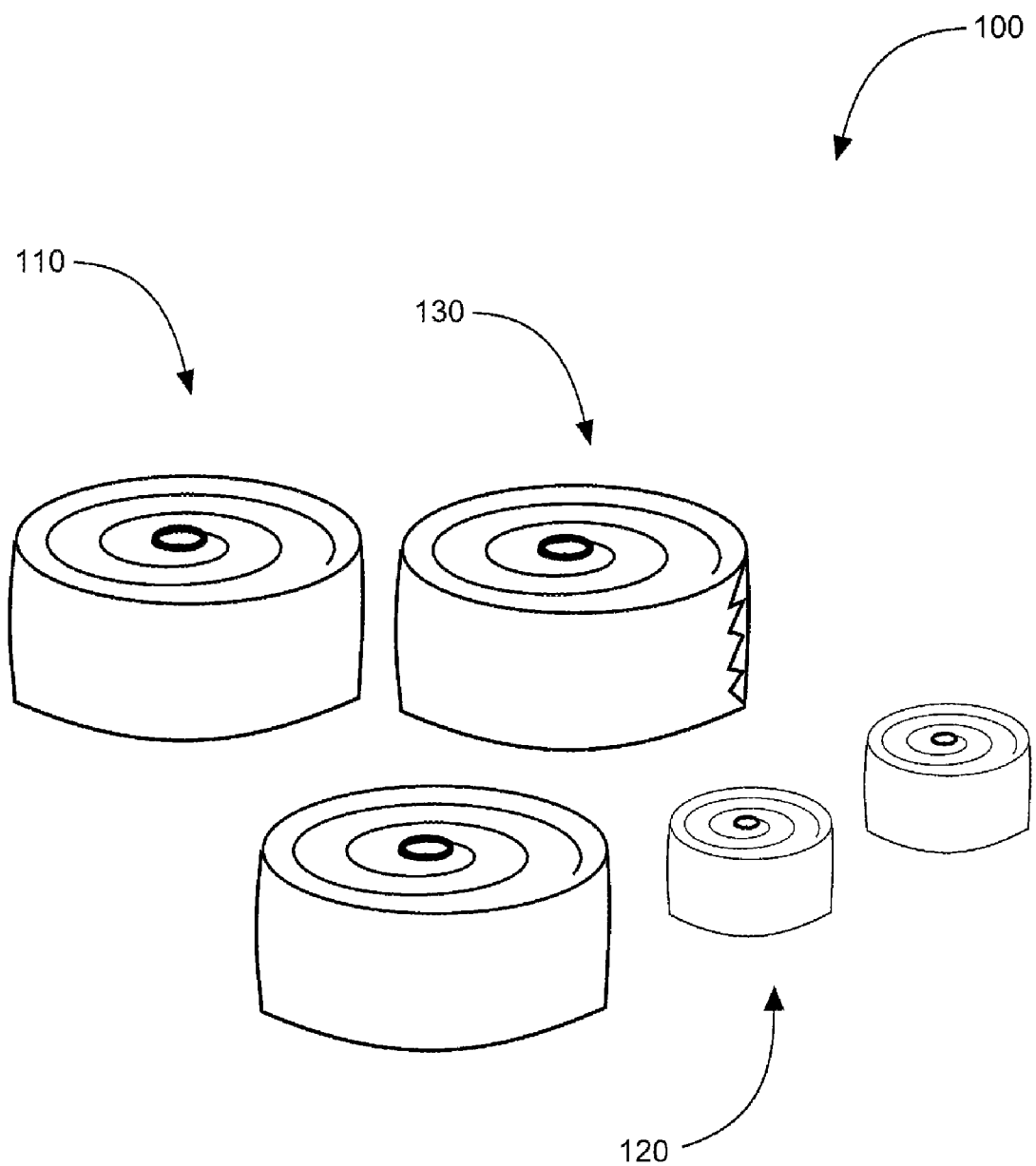
FIG. 5 is a perspective view illustrating rolls of vapor barrier tape for use with the seal guard lip & tape system according to an embodiment of the present invention of FIG. 1.

Referring now to FIG. 5, showing a perspective view illustrating rolls of vapor barrier tape 110 for use with seal guard lip & tape system 100 according to an embodiment of the present invention of FIG. 1.

In the preferred embodiment of the present invention seal guard lip & tape system 100 preferably comprises: vapor barrier tape 110; release liner 120 being 1½ inches wide; foam underlay 140 with vapor barrier qualities; wherein vapor barrier tape 110 is attachable to release liner 120 to form vapor barrier tape/release liner assembly 130; wherein release liner 120 is made of siliconized paper plastic (or other such suitable material) and covers about half of vapor barrier tape 110, thereby providing a suitably large adhesive surface area to avoid the above-mentioned problems within present flooring systems. Vapor barrier tape/release liner assembly 130 is attachable to a sheet of foam underlay 140 and an adjacent sheet of foam underlay 140; wherein joining of (two or more) adjacent sheets of foam underlay 140 creates a vapor barrier. In the present embodiment it is preferred that vapor barrier tape/release liner assembly 130 is used in conjunction with laminated flooring that foam underlay 140 provides a cushioning means therefore.

Release liner 120 is peelably removable from vapor barrier tape 110 as adjacent sheets of foam underlay 140 are joined, as shown in FIG. 1. It should also be noted that there is sufficient pliability and flexibility of vapor barrier tape 110 such that normal use of the installed flooring system does not comprise the vapor barrier via rubbing or vapor barrier tape 110 releasing from foam underlay 140. In this way the present invention is proven reliable for in use over extended durations minimizing maintenance and repair costs for homeowners.

Vapor barrier tape/release liner assembly 130 is joined to laminate underlay with 1½ inches of vapor barrier tape 110 and release liner 120 are exposed beyond foam underlay 140 to create a suitable surface to adhere thereto. As discussed above vapor barrier tape 110 may be removably (contact-adhesively) attached to release liner 120 to form vapor barrier tape/release liner assembly 130 via a roller-applier machine and/or in conjunction with vapor barrier tape dispensing machine 310.

Figure 6:
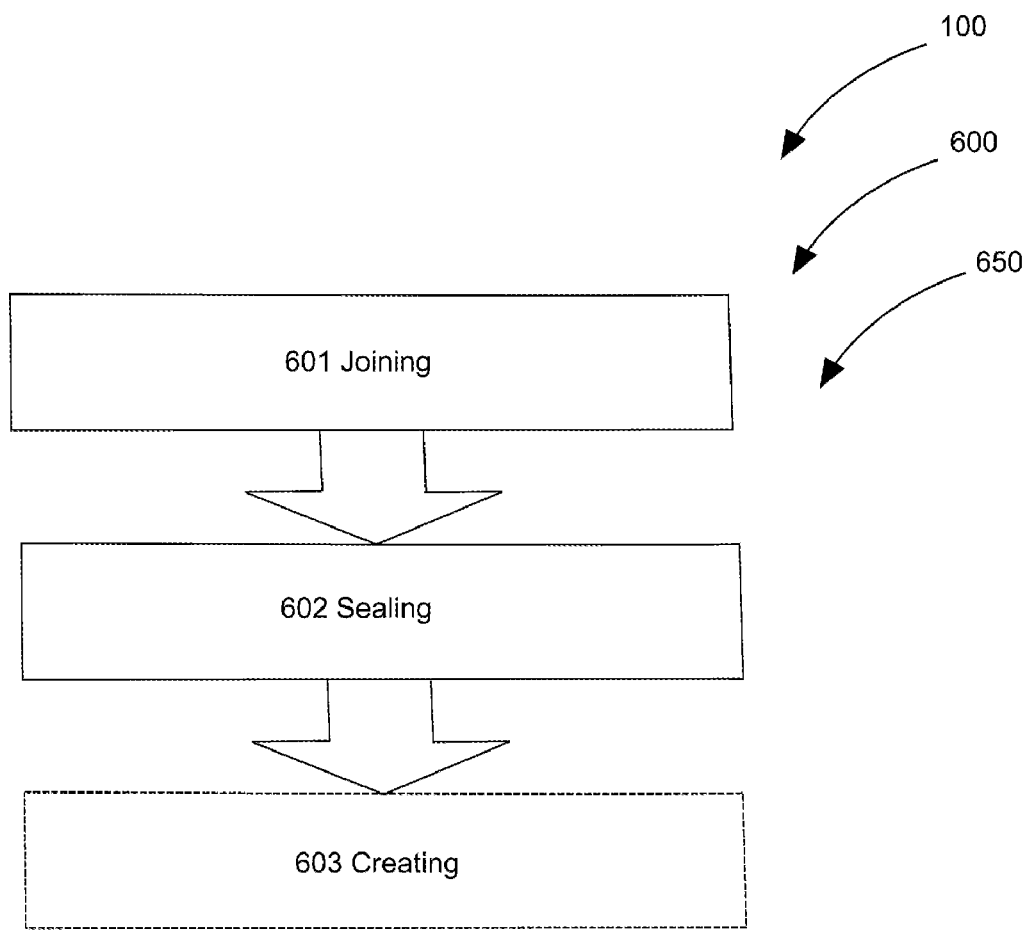
FIG. 6 is a flowchart illustrating a method of use for the seal guard lip & tape system according to an embodiment of the present invention of FIGS. 1-5.

Referring now to FIG. 6 is a flowchart 650 illustrating a method of use 600 for seal guard lip & tape system 100 according to embodiments of the present invention of FIGS. 1-5.

A method of using (at least herein embodying method of use 600) seal guard lip & tape system 100 preferably comprises the steps of: step one 601 joining of two laminate floor underlay sections (foam underlay 140) to create a vapor barrier (in floor installation process 150); and step two 602 sealing by utilizing vapor barrier tape/release liner assembly 130. Optionally the above method of use 600 may optionally comprise the step 603 of creating vapor barrier tape/release liner assembly 130. The step of sealing by utilizing vapor barrier tape/release liner assembly 130 may be accomplished via removing release liner from vapor barrier tape. It should be noted that there are optional steps provided herein that may not be implemented in all cases, these indicated in FIG. 6 via dotted lines.

A method of installation for the present invention for use with laminate, engineered and hardwood flooring may include the following steps: checking for nails; sweeping or damp mopping; rolling out one width of membrane with plastic flap on top; cutting the roll at the wall; installing the floor planks; rolling out the next width; peeling back the tape strip (on the plastic lip) and pushing down to adhere to the foam. The last four steps may be repeated until the floor installation is completed.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A building structural flooring seal guard lip & tape system comprising:
   a) flooring vapor barrier tape;
   b) release liner being about 1½ inches wide;

c) building structural flooring foam underlay
d) wherein said vapor barrier tape width is about twice the width of said release liner;
e) wherein said vapor barrier tape is attached to said release liner to form a vapor barrier tape/release liner assembly;
f) wherein said release liner is made of siliconized paper plastic, and covers about half of said vapor barrier tape;
g) wherein said vapor barrier tape/release liner assembly is sealably adhesively attached to said foam underlay with 1½ inches of said vapor barrier tape and said release liner are exposed beyond at least one edge of said foam underlay to create a suitable flooring sealing installation;
h) wherein a roller-applier machine adhesively attaches said vapor barrier tape/release liner assembly to said foam underlay; and
i) wherein said foam underlay further comprises a vapor barrier.

2. The seal guard lip & tape system of claim 1 wherein said vapor barrier tape/release liner assembly is sealably adhesively attachable to an adjacent sheet of said foam underlay.

3. The seal guard lip & tape system of claim 2 wherein joining of two said adjacent sheets of said foam underlay creates a flooring vapor barrier.

4. The seal guard lip & tape system of claim 1 wherein said vapor barrier tape/release liner assembly is for use under laminated flooring.

5. The seal guard lip & tape system of claim 1 wherein said vapor barrier tape is attached to said release liner to form said vapor barrier tape/release liner assembly via a roller-applier machine.

6. The seal guard lip & tape system of claim 5 wherein said roller-applier machine comprises rotatable wheels.

7. The seal guard lip & tape system of claim 6 wherein said rotatable wheels rotate to form said vapor barrier tape/release liner assembly.

8. The seal guard lip & tape system of claim 5 wherein said vapor barrier tape is removably attached to said release liner to form said vapor barrier tape/release liner assembly via a roller-applier machine such that said vapor barrier tape/release liner assembly is disassemblable.

9. The seal guard lip & tape system of claim 8 wherein said release liner is removable from said vapor barrier tape as said adjacent sheets of said underlay are joined.

10. A method of creating a seal guard lip & tape system of claim 1 comprising the steps of:
a) joining of two structural flooring foam underlay sections to create a vapor barrier; and
b) sealing by utilizing a vapor barrier tape/release liner assembly.

11. The method of claim 10 further comprising the step of creating said vapor barrier tape/release liner assembly.

12. The method of claim 11 wherein said step of creating said vapor barrier tape/release liner assembly is manual.

13. The method of claim 11 wherein said step of creating said vapor barrier tape/release liner assembly is non-manual.

14. The method of claim 13 wherein said step of creating said vapor barrier tape/release liner assembly is accomplished with a roller-applier machine.

15. The method of claim 10 wherein said step of sealing by utilizing said vapor barrier tape/release liner assembly is accomplished via removing release liner from vapor barrier tape.

16. A structural flooring seal guard lip & tape system comprising:
a) flooring vapor barrier tape;
b) release liner having a 1½ inches width;
c) building structural flooring foam underlay with vapor barrier qualities;
d) wherein said vapor barrier tape width is about twice the width of said release liner;
e) wherein said vapor barrier tape is attached to said release liner to form said vapor barrier tape/release liner assembly;
f) wherein said release liner is made of siliconized paper plastic, and covers half of said vapor barrier tape;
g) wherein said vapor barrier tape/release liner assembly is attachable to a sheet of said foam underlay and an adjacent sheet of said foam underlay;
h) wherein joining of two said adjacent sheets of said foam underlay creates a vapor barrier;
i) wherein said vapor barrier tape/release liner assembly is laminated;
j) wherein said release liner is removable from said vapor barrier tape as said adjacent sheets of said foam underlay are joined;
k) wherein said vapor barrier tape/release liner assembly is joined to said foam underlay with 1½ inches of said vapor barrier tape and said release liner are exposed beyond said foam underlay to create a suitable flooring sealing installation; and
l) wherein said vapor barrier tape is attached to said release liner to form said vapor barrier tape/release liner assembly via a roller-applier machine comprises rotatable wheels, said rotatable wheels form said vapor barrier tape/release liner assembly.

* * * * *